US012771066B2

(12) United States Patent
Cheng et al.

(10) Patent No.: US 12,771,066 B2
(45) Date of Patent: Oct. 20, 2026

(54) CONNECTOR AND ELECTRONIC DEVICE

(71) Applicant: HUAWEI TECHNOLOGIES CO., LTD., Shenzhen (CN)

(72) Inventors: Qiangqiang Cheng, Dongguan (CN); Xuecong Liu, Dongguan (CN); Feng Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 354 days.

(21) Appl. No.: 18/440,690

(22) Filed: Feb. 13, 2024

(65) Prior Publication Data

US 2024/0186750 A1 Jun. 6, 2024

Related U.S. Application Data

(63) Continuation of application No. PCT/CN2022/107815, filed on Jul. 26, 2022.

(30) Foreign Application Priority Data

Aug. 16, 2021 (CN) ......................... 202110937420.2

(51) Int. Cl.
*H01R 13/633* (2006.01)
*H01R 13/627* (2006.01)
*H01R 13/631* (2006.01)

(52) U.S. Cl.
CPC ....... *H01R 13/633* (2013.01); *H01R 13/6275* (2013.01); *H01R 13/631* (2013.01)

(58) Field of Classification Search
CPC . H01R 13/633; H01R 13/6275; H01R 13/631
See application file for complete search history.

(56) References Cited

U.S. PATENT DOCUMENTS 4,376,565 A 3/1983 Bird et al.
7,163,413 B2 * 1/2007 Murayama ......... H01R 13/6335 439/258
10,236,605 B1 * 3/2019 Henry .................. H01R 12/732
10,461,473 B1 * 10/2019 Hsiao ................. H01R 13/6335
(Continued)

FOREIGN PATENT DOCUMENTS

CN 102231461 A 11/2011
CN 202957402 U 5/2013
CN 204144617 A 2/2015
(Continued)

*Primary Examiner* — Neil Abrams
(74) *Attorney, Agent, or Firm* — Leydig, Voit & Mayer, Ltd.

(57) ABSTRACT

This application provides a connector and an electronic device, and the connector includes a socket assembly and a plug assembly that are plug-connected and fitted. The socket assembly includes a socket housing and a socket body, where the socket body is disposed in the socket housing, first wiring terminals are disposed on the socket body, and the socket housing is provided with at least one first guide groove extending in a first direction. The guide block fits the first guide groove, so that plug-connection guidance between the plug assembly and the socket assembly is implemented, oblique plugging of the plug assembly is prevented, pin crash in a plugging process is avoided, and blind mate in narrow space may be supported.

19 Claims, 9 Drawing Sheets

(56) References Cited

U.S. PATENT DOCUMENTS

| | | | | |
|---|---|---|---|---|
| 2019/0109393 | A1 | 4/2019 | Henry et al. | |
| 2024/0186750 | A1 * | 6/2024 | Cheng | H01R 13/631 |

FOREIGN PATENT DOCUMENTS

| | | | |
|---|---|---|---|
| CN | 104733925 | A | 6/2015 |
| CN | 106785613 | A | 5/2017 |
| CN | 207542490 | U | 6/2018 |
| CN | 208045830 | U | 11/2018 |
| CN | 109411918 | A | 3/2019 |
| CN | 208690643 | U | 4/2019 |
| CN | 208797273 | U | 4/2019 |
| CN | 209692064 | U | 11/2019 |
| CN | 210156592 | U | 3/2020 |
| CN | 111129867 | A | 5/2020 |
| CN | 111370887 | A | 7/2020 |
| CN | 211351144 | U | 8/2020 |
| CN | 212257868 | U | 12/2020 |
| CN | 112952423 | A | 6/2021 |
| TW | 454986 | U | 9/2001 |

* cited by examiner

CONNECTOR AND ELECTRONIC DEVICE

CROSS-REFERENCE TO RELATED APPLICATIONS

This application is a continuation of International Patent Application No. PCT/CN2022/107815, filed on Jul. 26, 2022, which claims priority to Chinese Patent Application No. 202110937420.2, filed on Aug. 16, 2021, the disclosures of which are hereby incorporated by reference in their entireties.

FIELD

This application relates to the field of connector technologies, and in particular, to a connector and an electronic device.

BACKGROUND

Connectors are widely used in electronic devices such as a server, a workstation, a switch, and a storage device. With improvement of a rate of the server and increasingly compact internal space arrangement of the server, some disadvantages of traditional connectors are gradually exposed. For example, the connector does not have guidance blind mate and plug-connection protection functions. When a socket connector fitting a plug connector is located in narrow space of a device, terminals (spring plates) of the socket connector are prone to be damaged during a plug-connection process of the plug connector and the socket connector. Consequently, a risk of an open or short circuit caused by yield damage of the socket terminal may exist, in other words, a common risk of pin crash exists. In addition, a metal contact member of the plug connector is prone to be scratched. In addition, when the socket connectors are arranged in an array with a small gap on a circuit board, a gap between two adjacent socket connectors is small. If unlocking members of the plug connector that is connected to a cable are arranged on two sides, it is difficult for fingers to extend into the gap between the adjacent socket connectors to pull out the plug connector, which affects operability of a product.

SUMMARY

This application provides a connector and an electronic device, to resolve a problem that terminals of a socket connector are prone to be damaged when a plug connector is plug-connected.

According to a first aspect, this application provides a connector, and the connector includes a socket assembly and a plug assembly that are plug-connected and fitted. The socket assembly includes a socket housing and a socket body, where the socket body is disposed in the socket housing, first wiring terminals are disposed on the socket body, and the socket housing is provided with at least one first guide groove extending in a first direction. The plug assembly includes a plug housing and a plug body, where the plug body is disposed in the plug housing, and second wiring terminals that are configured to be electrically connected to the first wiring terminals when the socket assembly and the plug assembly are plug-connected are disposed on the plug body; and one end that is of the plug housing and that faces the socket assembly is provided with at least one guide block extending in the first direction, the first direction is a plug-connection direction between the socket assembly and the plug assembly, and the guide block is configured to be assembled in the first guide groove.

According to a technical solution provided in this application, the guide block fits the first guide groove, so that quick alignment between the plug assembly and the socket assembly during plug-connection can be guided, plug-connection guidance between the plug assembly and the socket assembly can be implemented, oblique plugging of the plug assembly can be limited, damage to the first wiring terminals of the plug assembly during a plugging process can be avoided, and a possible pin crash phenomenon can be prevented. In addition, the second wiring terminals of the plug assembly can further be prevented from being scratched. Therefore, the connector provided in this application may support blind mate of the plug assembly and the socket assembly in narrow space, is easy to use, and works stably.

In an exemplary implementable solution, the first guide groove is formed by protruding the socket housing in a direction away from the socket body, at least one guide boss is disposed on one side that is of the socket body and that faces the first guide groove, the guide boss extends in the first direction, and the guide boss is located in the first guide groove. At least one second guide groove is disposed on one side that is of the guide block and that faces the plug body, the second guide groove extends in the first direction, and the second guide groove is configured to be plug-connected to the guide boss. The guide boss fits the second guide groove, so that the plug assembly and the socket assembly can be guided to be accurately plug-connected, and oblique plugging of the plug assembly can be limited. In addition, the guide block fits the first guide groove to form a first-level guide structure, and the guide boss fits the second guide groove to form a second-level guide structure. Therefore, the connector provided in this application has a dual guide structure. The dual guide structure not only can guide quick alignment between the plug assembly and the socket assembly during plug-connection, but also can effectively limit a plug-connection angle of the plug assembly, so that the plug assembly and the socket assembly can be more accurately and stably plug-connected.

When the guide boss is specifically disposed, there are a plurality of guide bosses. The plurality of guide bosses are disposed in parallel in a second direction, and each second guide groove is configured to be plug-connected to one or more guide bosses. The plurality of guide bosses fit the second guide groove, to jointly guide the plug assembly and the socket assembly to be plug-connected, so that a plug-connection process is more stable and more accurate.

When the guide block is specifically disposed, there are plurality of guide blocks. The plurality of guide blocks are disposed in parallel in the second direction, and each first guide groove is configured to be plug-connected to one or more guide blocks. The plurality of guide blocks fit the first guide groove, to jointly guide the plug assembly and the socket assembly to be plug-connected, so that stability and accuracy of plug-connection is improved.

In an exemplary implementable solution, a latch boss is disposed on the socket housing. A latch assembly is disposed on the plug housing, and the latch assembly includes a latch body and a pull strap. A first end of the latch body is connected to the plug housing, and a second end of the latch body is configured to be fastened to the latch boss. The latch body fits the latch boss, so that locking between the plug assembly and the socket assembly can be implemented. Compared with a conventional hole-type fastening point, fastening strength is higher, and locking after the plug assembly and the socket assembly are assembled is more stable. The pull strap is connected to the latch body, and is configured to drive the second end of the latch body to move, to separate the latch body from the latch boss. The pull strap occupies small space, and the pull strap is used to drive the latch body to be unfastened to the latch boss, so that overall layout density of the connector can be improved, space required for an unlocking operation can be reduced, operability of unlocking can be enhanced, and a risk of accidental unlocking can be avoided.

In an exemplary implementable solution, the latch body includes a fastening part, force arm parts, and latch parts. The fastening part is connected to the plug housing. One end of the force arm parts is connected to the fastening part, and the latch parts are disposed at the other end of the force arm parts. The latch parts are configured to be fastened to the latch boss. The pull strap is connected to the force arm parts, and the pull strap pulls the force arm parts to drive the latch parts to be unfastened to the latch boss, so that an unlocking operation is convenient and labor-saving.

In an exemplary implementable solution, a positioning part is disposed on the force arm parts. The positioning part and the force arm parts are disposed at an included angle, and the pull strap is connected to the positioning part. The positioning part is disposed to facilitate connection between the pull strap and the force arm parts.

When the force arm parts are specifically disposed, there are a plurality of force arm parts. The plurality of force arm parts are disposed in parallel in the second direction that is perpendicular to the first direction, and the positioning part is disposed between adjacent force arm parts. The latch parts at ends of the plurality of force arm parts are jointly fastened to the latch boss, so that stability after the plug assembly and the socket assembly are locked is improved. The positioning part is disposed between adjacent force arm parts, and the plurality of force arm parts may be driven by pulling the positioning part by using the pull strap, to facilitate unlocking.

When the fastening part is specifically disposed, the fastening part includes a first side wall, a second side wall, and a third side wall. The first side wall and the third side wall are disposed in parallel, and the second side wall is connected between the first side wall and the third side wall. The first side wall is connected to the plug housing, the second side wall is provided with a first through hole, and the third side wall is provided with a second through hole. A first end of the pull strap successively passes through the first through hole and the second through hole, winds the positioning part, and is connected to the third side wall. The fastening part provides a force point for the pull strap. The pull strap fits the fastening part, so that unlocking pulling force can be converted into unlocking force perpendicular to a plug-connection direction, to drive the latch parts to lift for unlocking. Therefore, a limitation on a direction of the unlocking pulling force can be reduced, so that a direction of applying the unlocking pulling force can be more flexible, and an unlocking operation is more convenient.

In an exemplary implementable solution, the first end of the pull strap is provided with a fastening opening, and a fastening protrusion is disposed on the third side wall. The first end of the pull strap is connected to the fastening protrusion through the fastening opening, which facilitates fastening the pull strap.

In an exemplary implementable solution, an installation groove is disposed on the plug housing, the latch body is disposed in the installation groove, and the second end of the latch body extends out of the installation groove. A cross member is disposed on a side wall of the installation groove, and a first end of the pull strap extends into the installation groove, winds the cross member, and is connected to the latch body. The cross member provides a force point for the pull strap. The pull strap fits the cross member, so that unlocking pulling force can be converted into unlocking force perpendicular to a plug-connection direction, to drive the latch parts to lift for unlocking. Therefore, a limitation on a direction of the unlocking pulling force can be reduced, so that a direction of applying the unlocking pulling force can be more flexible, and an unlocking operation is facilitated.

In an exemplary implementable solution, an extension part is disposed at one end that is of the plug housing and that faces the socket assembly, and the extension part includes a first extension segment, a second extension segment, and a third extension segment. The first extension segment and the third extension segment are respectively located on two sides that are of the plug housing and that are in the first direction, the second extension segment is connected between the first extension segment and the third extension segment, the first extension segment and the third extension segment are configured to limit the plug housing in the second direction, and the second extension segment is configured to limit the plug housing in a third direction. The third direction is perpendicular to the first direction and the second direction separately. After the plug assembly and the socket assembly are plug-connected, the first extension segment and the third extension segment may limit the plug housing in the second direction, and the second extension segment may limit the plug housing in the third direction. Therefore, the plug assembly is prevented from being loose due to accidental touch, and location stability after the plug assembly and the socket assembly are plug-connected is improved.

According to a second aspect, this application provides an electronic device, and the electronic device includes a first circuit board, a second circuit board, a cable, and the foregoing connector. Two ends of the cable are electrically connected to the plug assembly separately. The first circuit board is electrically connected to the socket assembly, and the second circuit board is electrically connected to the socket assembly. The plug assembly at one end of the cable is plug-connected to and fits the socket assembly on the first circuit board, and the plug assembly at the other end of the cable is plug-connected to and fits the socket assembly on the second circuit board. Therefore, the first circuit board is electrically connected to the second circuit board.

According to a technical solution provided in this application, the first circuit board and the second circuit board may be electrically connected at a long distance by using the cable and the connector provided in this application. The connector is not prone to be damaged in a fitting process, and is reliably connected after the fitting, so that working stability of the electronic device can be improved.

REFERENCE NUMERALS

1—Motherboard; 2—Daughter board; 3—Cable; 100—Plug assembly; 200—Socket assembly; 110—Plug housing;

120—Plug body; 130—Second wiring terminal; 140—Extension part; 150—Latch assembly; 111—Guide block;

112—Plug-connection groove; 113—Second guide groove; 114—Installation groove; 115—Cross member; 116—Positioning groove;

141—First extension segment; 142—Second extension segment; 143—Third extension segment; 151—Latch body; 152—Pull strap;

153—Positioning piece; 1510—Fastening part; 1511—Force arm part; 1512—Latch part; 1513—Positioning part;

1514—First side wall; 1515—Second side wall; 1516—Third side wall; 1517—First through hole; 1518—Second through hole;

1519—Fastening protrusion; 210—Socket housing; 220—Socket body; 230—First wiring terminal;

211—First guide groove; 212—Latch boss; 221—Guide boss.

DESCRIPTION OF EMBODIMENTS

The following describes in detail embodiments of this application with reference to accompanying drawings.

Figure 1:
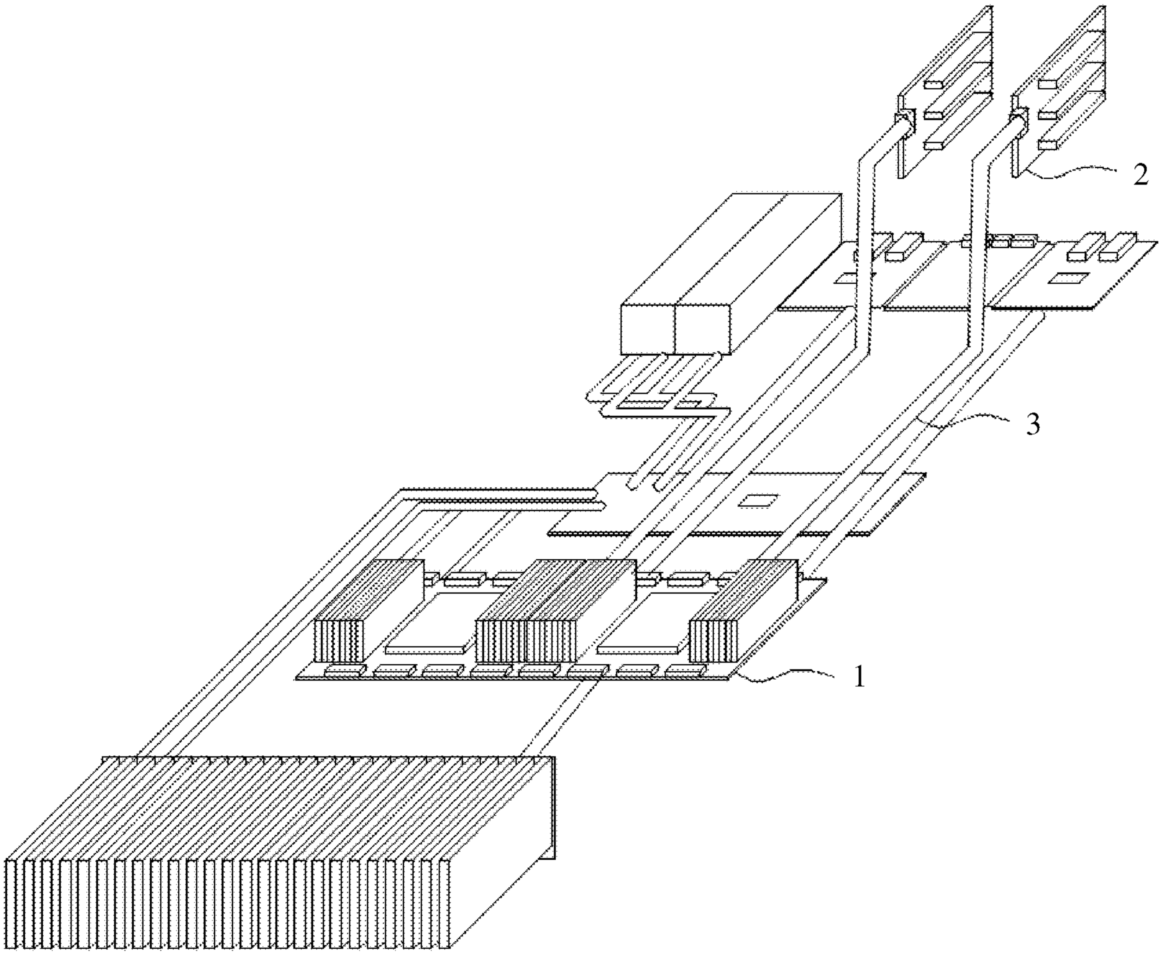
FIG. 1 is a possible embodiment of a connector according to an embodiment of this application.

For ease of understanding, an application scenario of a connector in this application is first described. The connector provided in embodiments of this application may adapt to electronic devices such as a server, a workstation, a switch, and a storage device. In a possible embodiment, the connector is used in a server. Refer to FIG. 1, the server may include a first circuit board and a second circuit board. For example, the first circuit board may be a motherboard 1, and the second circuit board may be a daughter board 2. The motherboard 1 and the daughter board 2 may be electrically connected by using a cable 3 and the connector provided in embodiments of this application.

Figure 2:
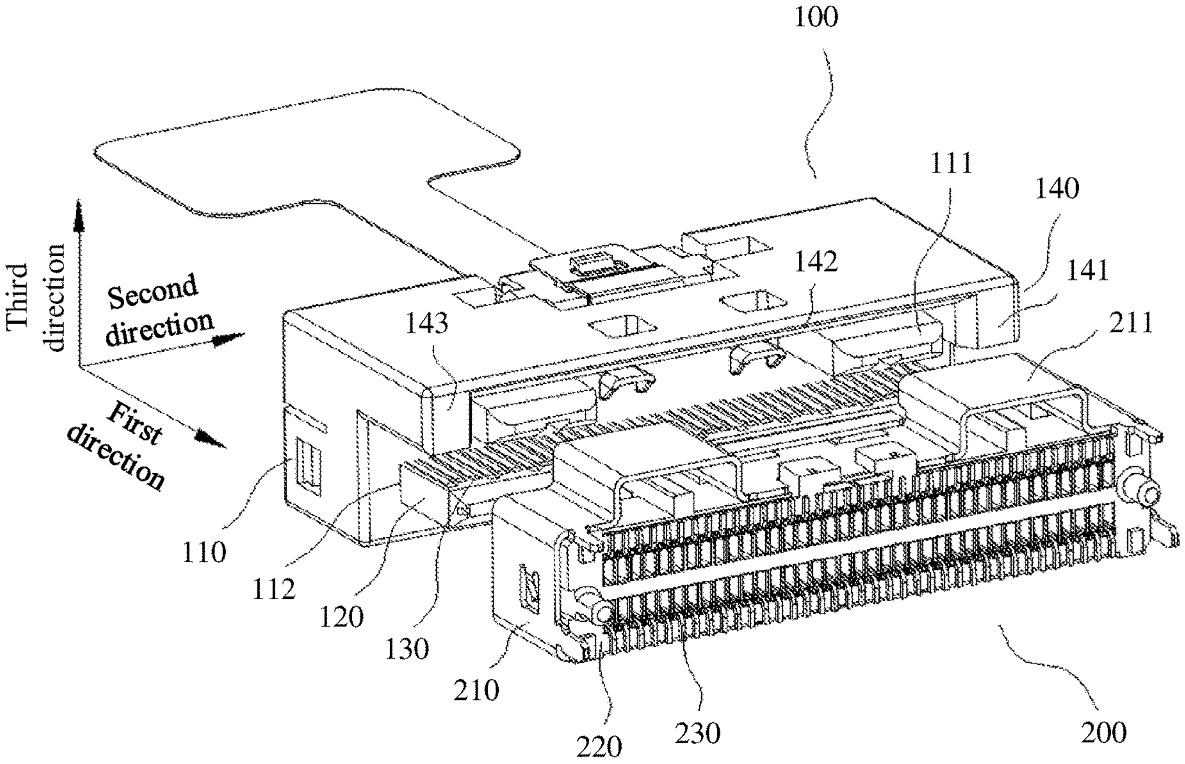
FIG. 2 is a schematic diagram of a possible structure of a connector according to an embodiment of this application.

More specifically, FIG. 2 is a schematic diagram of a possible structure of a connector according to an embodiment of this application. As shown in FIG. 2, the connector provided in this embodiment of this application may include a plug assembly 100 and a socket assembly 200. The plug assembly 100 and the socket assembly 200 may be electrically connected through plug-connection. The plug assembly 100 may be disposed at two ends of a cable and electrically connected to the cable separately. The socket assembly 200 is disposed on a first circuit board and is electrically connected to the first circuit board. The socket assembly 200 is further disposed on a second circuit board and is electrically connected to the second circuit board. The plug assembly 100 at one end of the cable is plug-connected to and fits the socket assembly 200 on the first circuit board, and the plug assembly 100 at the other end of the cable is plug-connected to and fits the socket assembly 200 on the second circuit board. Therefore, the first circuit board is electrically connected to the second circuit board.

The socket assembly 200 may include a socket housing 210 and a socket body 220, and the socket body 220 is disposed in the socket housing 210. A plurality of first wiring terminals 230 are arranged in an array on the socket body 220, and the first wiring terminals 230 may be electrically connected to the circuit board. The socket housing 210 may be provided with at least one first guide groove 211 extending in a first direction, and the first direction is a plug-connection direction between the socket assembly 200 and the plug assembly 100.

The plug assembly 100 may include a plug housing 110 and a plug body 120, and the plug body 120 is disposed in the plug housing 110. The plug body 120 may be a printed circuit board. A plurality of second wiring terminals 130 are arranged in an array on the plug body 120, and the second wiring terminals 130 may be connected to the cable. When the plug assembly 100 and the socket assembly 200 are plug-connected and fitted, the plug body 120 is connected to the socket body 220, and the second wiring terminals 130 are in contact with the first wiring terminals 230 for conductive connection. One end that is of the plug housing 110 and that faces the socket assembly 200 is provided with at least one guide block 111 extending in the first direction. When the plug assembly 100 and the socket assembly 200 are plug-connected and fitted, the guide block 111 may extend into a first guide groove 211. Therefore, the guide block 111 fits the first guide groove 211, quickly alignment between the plug assembly 100 and the socket assembly 200 during plug-connection can be guided, plug-connection guidance between the plug assembly 100 and the socket assembly 200 can be implemented, oblique plugging of the plug assembly 100 can be limited, for example, a maximum plugging angle may be limited to 2.37°, damage to the first wiring terminals 230 of the plug assembly 100 during a plugging process can be avoided, and a possible pin crash phenomenon can be avoided. In addition, the second wiring terminals 130 of the plug assembly 100 can further be prevented from being scratched. Therefore, the connector provided in this embodiment of this application may support blind mate of the plug assembly 100 and the socket assembly 200 in narrow space.

For ease of description, two ends of the socket housing 210 in the first direction are respectively defined as a first end and a second end. When the plug assembly 100 and the socket assembly 200 are plug-connected and fitted, the first end of the socket housing 210 faces the plug assembly 100. The socket housing 210 is provided with internal accommodation space. The first end and the second end are respectively provided with a first opening and a second opening, and the first opening and the second opening separately communicate with the accommodation space. The socket body 220 may be fastened to the accommodation space of the socket housing 210, and two ends of the first wiring terminals 230 may be exposed from the first opening and the second opening respectively.

Similarly, two ends of the plug housing 110 in the first direction are respectively defined as a first end and a second end. When the plug assembly 100 and the socket assembly 200 are plug-connected and fitted, the first end of the plug housing 110 faces the socket assembly 200. A plug-connection groove 112 may be disposed at the second end of the plug housing 110. A first end and a second end of the plug-connection groove 112 in the first direction are respectively provided with a third opening and a fourth opening, and the third opening is close to the first end of the plug housing 110. The plug body 120 may be clamped in the plug-connection groove 112. One end of the second wiring terminals 130 may extend out of the plug-connection groove 112 from the third opening, and the other end of the second wiring terminals 130 is exposed from the fourth opening.

In an exemplary implementation, an extension part 140 may be disposed at the first end of the plug housing 110. The extension part 140 may include a first extension segment 141, a second extension segment 142, and a third extension segment 143. The first extension segment 141 and the third extension segment 143 may be respectively located on two sides that are of the plug housing 110 and that are in the first direction. The second extension segment 142 may be connected between the first extension segment 141 and the third extension segment 143. In an exemplary implementation, the first extension segment 141, the second extension segment 142, and the third extension segment 143 may be integrally formed with the plug housing 110. For example, the entire extension part 140 may be integrally formed with the plug housing 110. To improve location stability after the plug assembly 100 and the socket assembly 200 are plug-connected, side walls that are of the first guide groove 211 and that are in a second direction in FIG. 2 may be in contact with the first extension segment 141 and the third extension segment 143 respectively after the plug assembly 100 and the socket assembly 200 are plug-connected, or there may be small gaps between the side walls and the first extension segment 141 and the third extension segment 143. Therefore, the plug housing 110 may be limited in the second direction. In addition, a side wall that is of the first guide groove 211 and that is in a third direction in FIG. 2 may be in contact with the second extension segment 142, or there is a small gap between the side wall and the second extension segment 142. Therefore, the plug housing 110 may be limited in the third direction, and the plug assembly 100 is prevented from being loose due to accidental touch. In FIG. 2, the second direction is perpendicular to the first direction, the third direction is perpendicular to the first direction, and the third direction is also perpendicular to the second direction. The guide block 111 is disposed at the first end of the plug housing 110. The guide block 111 may be located between the first extension segment 141 and the third extension segment 143, and there are gaps between the guide block 111 and the first extension segment 141 and the third extension segment 143 separately, to provide plug-connection space for the guide block 111 and the first guide groove 211.

In an exemplary implementation, the socket housing 210 may be a metal housing, or may be of a housing structure made of a non-metal material, and a surface of the housing structure is provided with a metal plating layer, to facilitate welding the socket housing 210 on the circuit board. The socket body 220 may be made of an insulation material. The plug housing 110 and the plug body 120 may be made of an insulation material. The first wiring terminals 230) and the second wiring terminals 130 may be metal terminals.

For the guide block 111 and the first guide groove 211 that are fitted, one end that is of the guide block 111 and that is plug-connected to the first guide groove 211 may have an inclined surface or a curved surface, so that a cross-sectional area of the end of the guide block 111 is reduced, to facilitate plug-connecting the guide block 111 to the first guide groove 211. The first guide groove 211 may be integrally formed with the socket housing 210. More specifically, the first guide groove 211 may be formed by protruding a part of the socket housing 210 in a direction away from the socket body 220.

There may be a plurality of guide blocks 111. FIG. 2 shows a case in which there are two guide blocks 111. The two guide blocks 111 in FIG. 2 are disposed in parallel in the second direction, and are located on a same side of the plug body 120. A quantity of first guide grooves 211 may be the same as a quantity of guide blocks 111, and the first guide grooves 211 are plug-connected to the guide blocks 111 in a one-to-one correspondence. In this case, the width of the guide block 111 may be equal to or slightly less than the width of the first guide groove 211. For example, two side walls that are of the guide block 111 and that are opposite to each other in a width direction may be in contact with the two inner side walls that are of the first guide groove 211 and that are opposite to each other in a width direction respectively, there is a gap between one side wall of the guide block 111 and one inner side wall of the first guide groove 211, and the other side wall of the guide block 111 is in contact with the other inner side wall of the first guide groove 211, or there are gaps between the two side walls of the guide block 111 and the inner side walls of the first guide groove 211. In this way, plug-connection between the plug assembly 100 and the socket assembly 200 can be guided, and a plug-connection angle of the plug assembly 100 can be limited, so that the plug assembly 100 cannot be plugged obliquely at a large angle. Therefore, pin crash caused by oblique plugging is effectively avoided. In addition, the plurality of guide blocks 111 may be symmetrically distributed on the plug housing 110. Correspondingly, the first guide grooves 211 are also symmetrically distributed on the socket housing 210, so that a plug-connection process between the plug assembly 100 and the socket assembly 200 can be more smoothly, and relative locations after the plug-connection can be more stable.

In some other embodiments, a quantity of guide blocks 111 may be greater than a quantity of first guide grooves 211. One first guide groove 211 may correspond to a plurality of guide blocks 111, for example, one first guide groove 211 may be plug-connected to the plurality of guide blocks 111. In this case, the total width and the total spacing that are of the plurality of guide blocks 111 corresponding to the first guide groove 211 may be equal to or slightly less than the width of the first guide groove 211. In other words, two outermost guide blocks 111 of the plurality of guide blocks 111 may be in contact with the two inner side walls that are of the first guide groove 211 and that are opposite to each other in the width direction respectively, there is a gap between one outermost guide block 111 and one inner side wall of the first guide groove 211, and the other outermost guide block 111 is in contact with the other inner side wall of the first guide groove 211, or there are gaps between the two outermost guide blocks 111 and the two inner side walls of the first guide groove 211.

Figure 3:
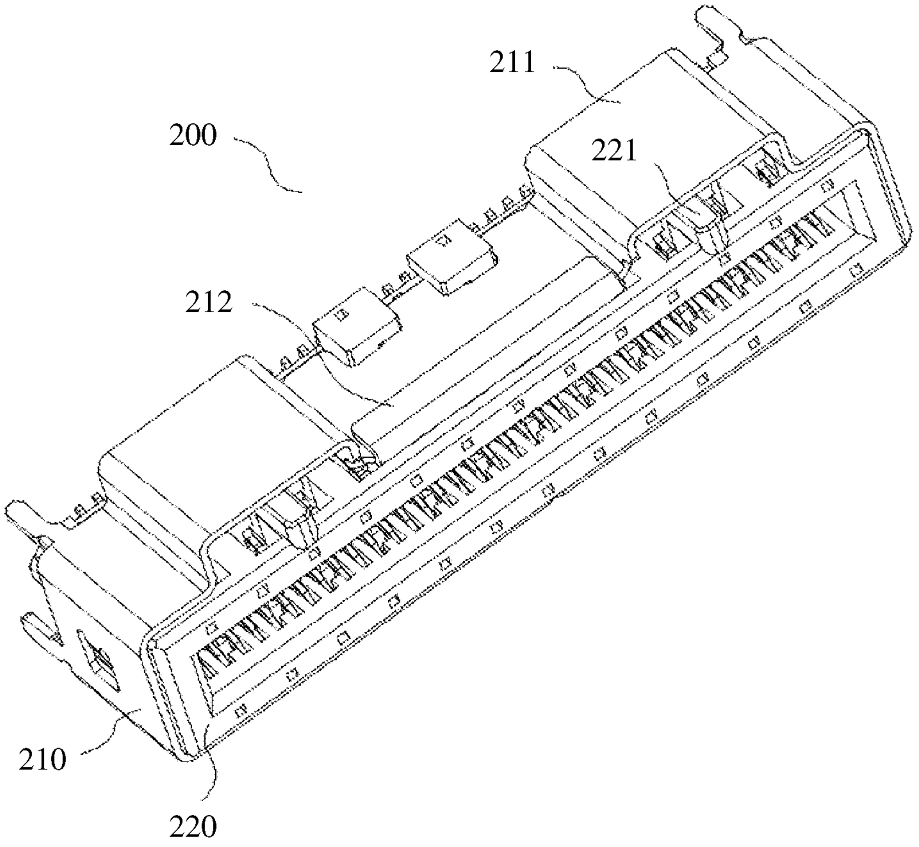
FIG. 3 is a schematic diagram of a structure of a socket assembly of a connector according to an embodiment of this application.
Figure 4:
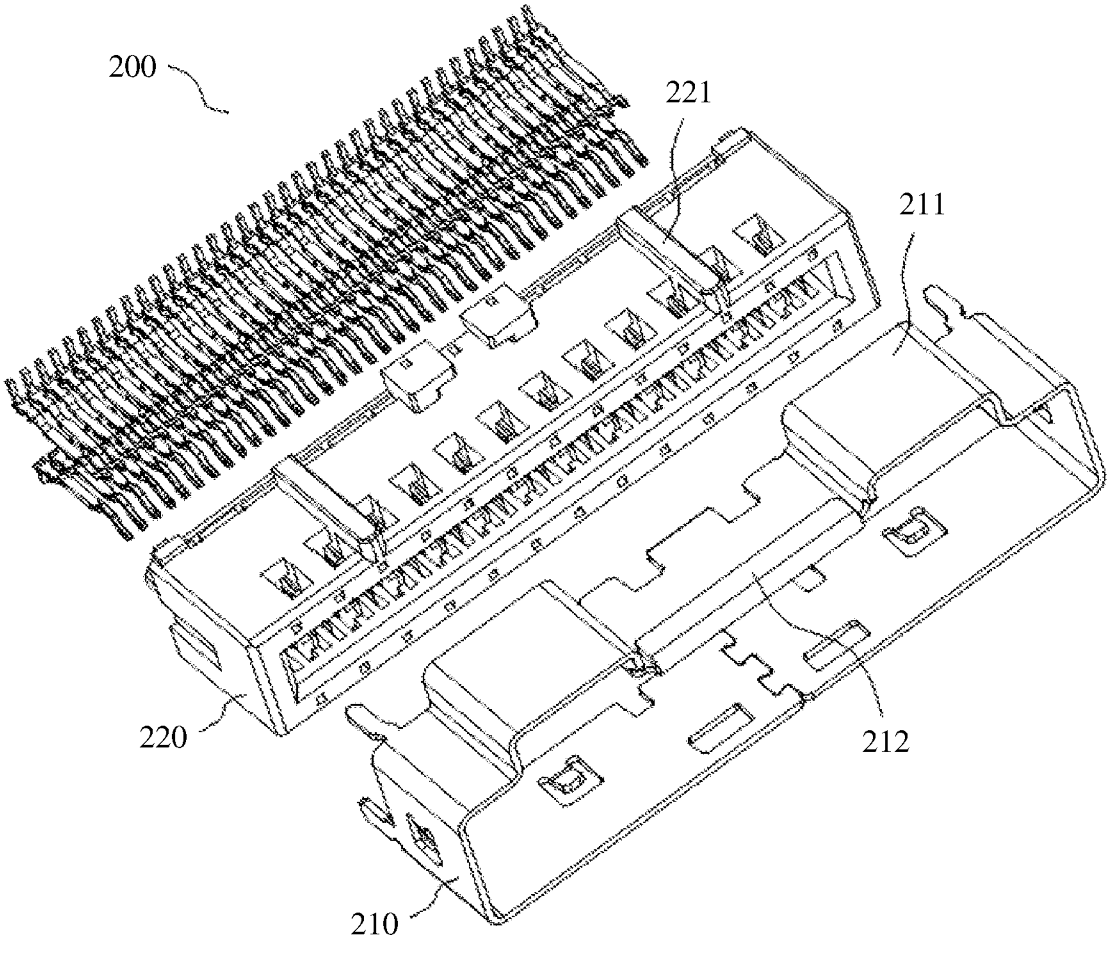
FIG. 4 is a schematic diagram of a split structure of a socket assembly of a connector according to an embodiment of this application.
Figure 5:
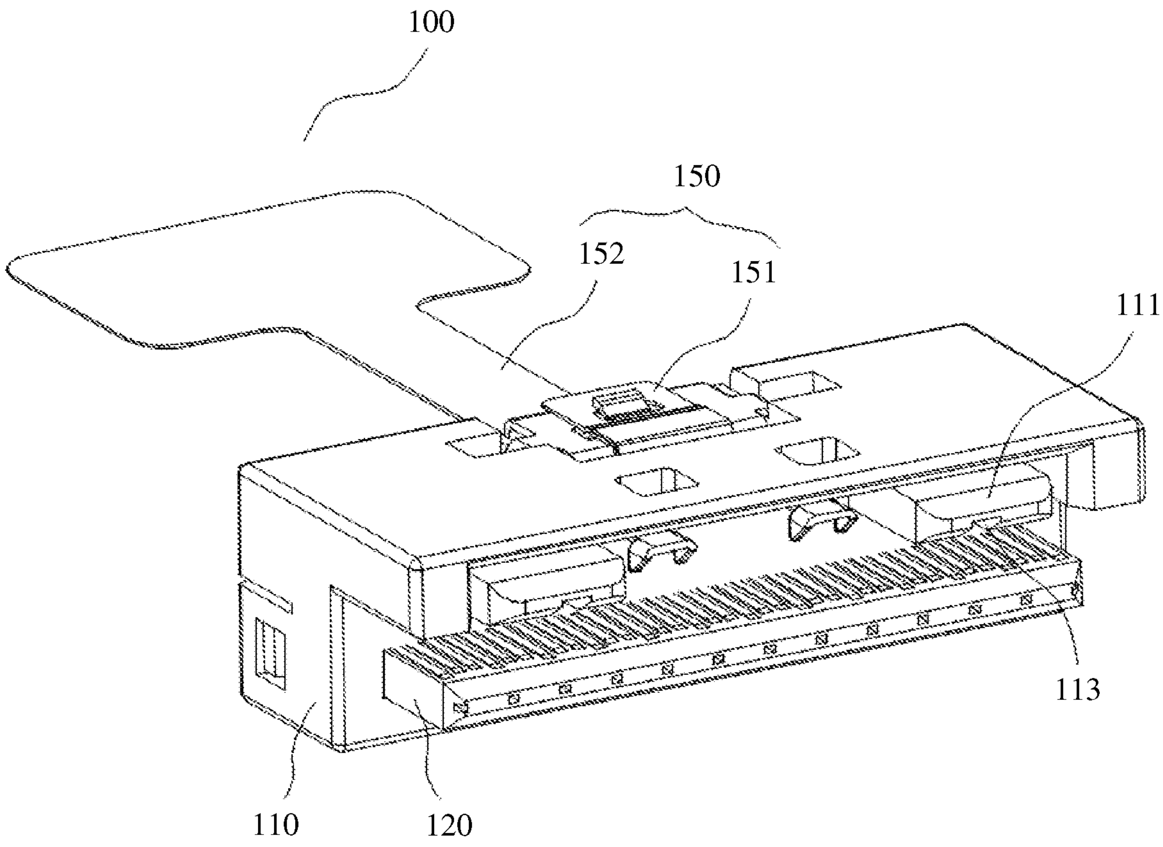
FIG. 5 is a schematic diagram of a structure of a plug assembly of a connector according to an embodiment of this application.
Figure 6:
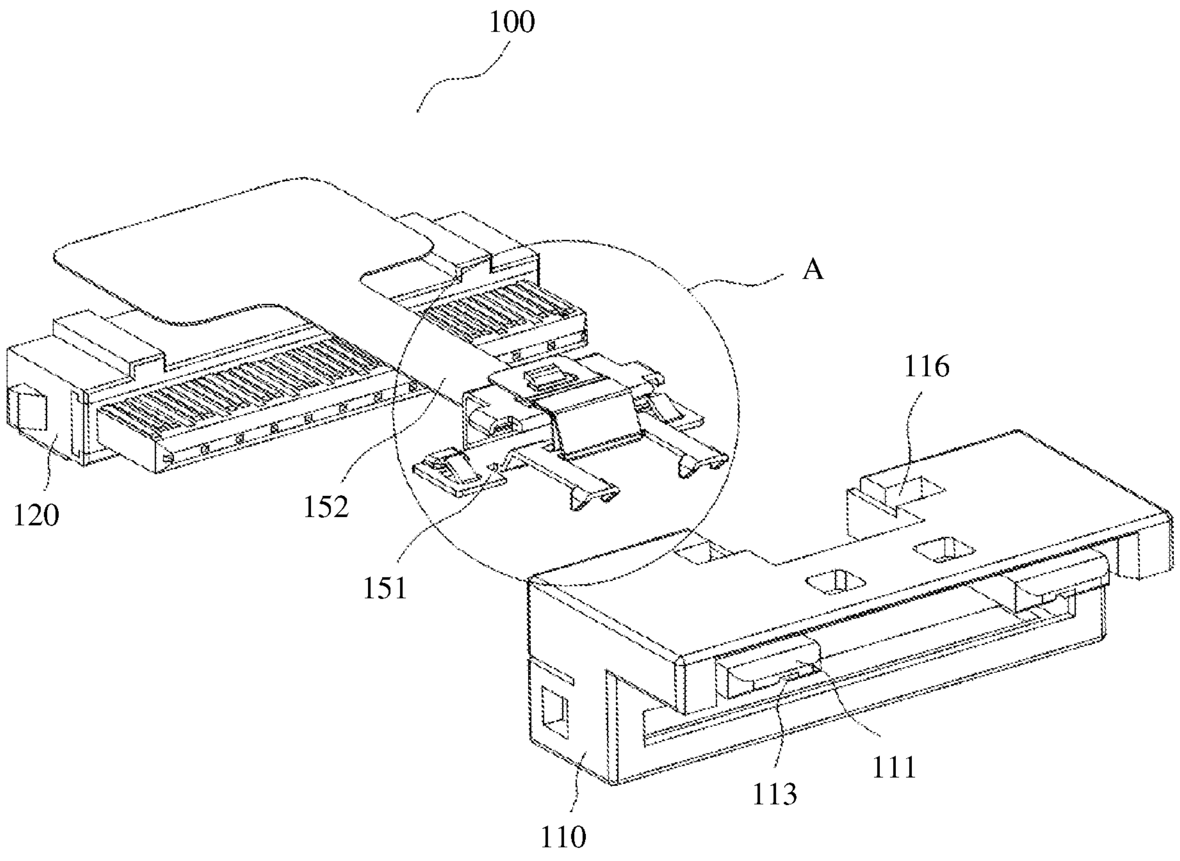
FIG. 6 is a schematic diagram of a split structure of a plug assembly of a connector according to an embodiment of this application.

To describe the connector provided in this embodiment of this application more clearly, the connector shown in FIG. 2 is disassembled. FIG. 3 is a schematic diagram of a structure of a socket assembly of a connector according to an embodiment of this application. FIG. 4 is a schematic diagram of a split structure of a socket assembly of a connector according to an embodiment of this application. FIG. 5 is a schematic diagram of a structure of a plug assembly of a connector according to an embodiment of this application. FIG. 6 is a schematic diagram of a split structure of a plug assembly of a connector according to an embodiment of this application.

With reference to FIG. 3 to FIG. 6, in a possible embodiment, at least one guide boss 221 extending in the first direction may be disposed on a side wall that is of the socket body 220 and that faces the first guide groove 211, and the guide boss 221 may be located in the first guide groove 211. At least one second guide groove 113 extending in the first direction is disposed on a side wall that is of the guide block 111 and that faces the plug body 120. When the plug assembly 100 and the socket assembly 200 are plug-connected and fitted, the guide boss 221 may extend into the second guide groove 113. Therefore, the guide boss 221 fits the second guide groove 113, so that plug-connection between the plug assembly 100 and the socket assembly 200 can be guided. With reference to the foregoing description, the connector provided in this embodiment of this application has a dual guide structure. The guide block 111 and the first guide groove 211 may be understood as a first-level guide structure, and the guide boss 221 and the second guide groove 113 may be understood as a second-level guide structure. The second-level guide structure may be disposed to further limit a plug-connection angle of the plug assembly 100, and provide more accurate and stable guidance for the plug-connection between the plug assembly 100 and the socket assembly 200. It may be understood that, compared with one end that is of the guide boss 221 and that is plug-connected to the second guide groove 113, one end that is of the first guide groove 211 and that is plug-connected to the guide block 111 may be closer to a first end of the socket housing 210. Therefore, when the plug assembly 100 and the socket assembly 200 are plug-connected and fitted, the first guide groove 211 fits the guide block 111 first, and then the guide boss 221 fits the second guide groove 113. For example, the first-level guide structure may first guide quick alignment between the plug assembly 100 and the socket assembly 200, to implement first-level guidance of plug-connection between the plug assembly 100 and the socket assembly 200, and then, the second-level guide structure guides accurate plug-connection between the plug assembly 100 and the socket assembly 200, to implement second-level guidance of plug-connection between the plug assembly 100 and the socket assembly 200.

For the guide boss 221 and the second guide groove 113 that are fitted, the end that is of the guide boss 221 and that is plug-connected to the second guide groove 113 may have an inclined surface or a curved surface, so that a cross-sectional area of the end of the guide boss 221 is reduced, to facilitate plug-connecting the guide boss 221 to the second guide groove 113.

Figure 7:
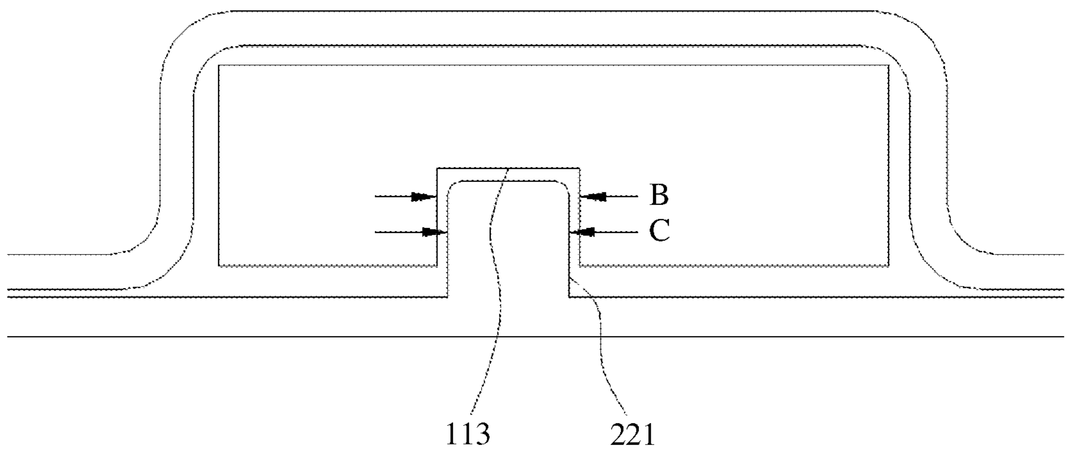
FIG. 7 is a schematic diagram of a fitting status between a second guide groove and a guide boss that are of a connector according to an embodiment of this application.

There may be a plurality of guide bosses 221. FIG. 3 and FIG. 4 show cases in which there are two guide bosses 221. The two guide bosses 221 may be disposed in parallel in the second direction, and are located on a same side of the socket body 220. For example, the two guide bosses 221 may be disposed in two first guide grooves 211 respectively. A quantity of the second guide grooves 113 may be the same as a quantity of the guide bosses 221. In this case, the two second guide grooves 113 may be disposed on the two guide blocks 111 respectively, and the second guide grooves 113 are plug-connected to the guide bosses 221 in a one-to-one correspondence. In this case, the width of the guide boss 221 may be equal to or slightly less than the width of the second guide groove 113. It may be understood as that two side walls that are of the guide boss 221 and that are opposite to each other in a width direction may be in contact with two inner side walls that are of the second guide groove 113 and that are opposite to each other in a width direction respectively, there is a gap between one side wall of the guide boss 221 and one inner side wall of the second guide groove 113, and the other side wall of the guide boss 221 is in contact with the other inner side wall of the second guide groove 113, or there are gaps between the two side walls of the guide boss 221 and the two inner side walls of the second guide groove 113. In this way, plug-connection between the plug assembly 100 and the socket assembly 200 can be guided, and a plug-connection angle of the plug assembly 100 can be limited. As shown in FIG. 7, for example, the width B of the second guide groove 113 may be 1±0.03 mm, and the width C of the guide boss 221 may be 0.85±0.03 mm.

In some other embodiments, a quantity of guide bosses 221 may be greater than a quantity of second guide grooves 113. One second guide groove 113 may correspond to a plurality of guide bosses 221, for example, one second guide groove 113 is plug-connected to the plurality of guide bosses 221. In this case, the total width and the total spacing that are of the plurality of guide bosses 221 corresponding to the second guide groove 113 may be equal to or slightly less than the width of the second guide groove 113. It may be understood as that two outermost guide bosses 221 that are of the plurality of guide bosses 221 may be in contact with two inner side walls that are of the second guide groove 113 and that are opposite to each other in the width direction, there is a gap between one outermost guide boss 221 and one inner side wall of the second guide groove 113, and the other outermost guide boss 221 is in contact with the other inner side wall of the second guide groove 113, or there are gaps between the two outermost guide bosses 221 and the two inner side walls of the second guide groove 113.

In a possible embodiment, a latch boss 212 may be disposed on the socket housing 210. A latch assembly 150 may be disposed on the plug housing 110, and the latch assembly 150 may include a latch body 151 and a pull strap 152. A first end of the latch body 151 is connected to the plug housing 110. After the plug assembly 100 and the socket assembly 200 are plug-connected in position. A second end of the latch body 151 may be fastened to a latch boss 212, so that the plug assembly 100 and the socket assembly 200 are locked. The pull strap 152 is connected to the latch body 151. When the plug assembly 100 and the socket assembly 200 need to be unlocked, the pull strap 152 is pulled to drive the second end of the latch body 151 to move, to release a fastening relationship between the second end of the latch body 151 and the latch boss 212. The latch body 151 fits the latch boss 212, so that locking between the plug assembly 100 and the socket assembly 200 can be implemented. Compared with a conventional hole-type fastening point, fastening strength is higher, and locking after the plug assembly 100 and the socket assembly 200 are assembled is more stable. In addition, the pull strap 152 occupies small space, and the pull strap 152 is used to drive the latch body 151 to be unfastened to the latch boss 212, so that overall layout density of the connector can be improved, space required for an unlocking operation can be reduced, for example, at least 20 mm of operation space required for pressing and unlocking by a hand can be saved, operability of unlocking can be enhanced, and a risk of accidental locking can be avoided.

In an exemplary implementation, the latch body 151 may be made of a metal material. The first end of the latch body 151 to the second end of the latch body 151 may extend in a first direction. The latch boss 212 may be disposed perpendicular to the first direction. The latch boss 212 may be formed by rolling a sheet-shaped structure. More specifically, the latch boss 212 may be formed by rolling an outer edge of a first end of the socket housing 210 toward a second end direction, to implement integrated forming with the socket housing 210. A cross-sectional shape of the latch boss 212 in the first direction may be approximately a shape of a paper clip. The pull strap 152 may be a thin sheet-shaped structure that is made of a metal material and that has a specific deformation capability.

Figure 8:
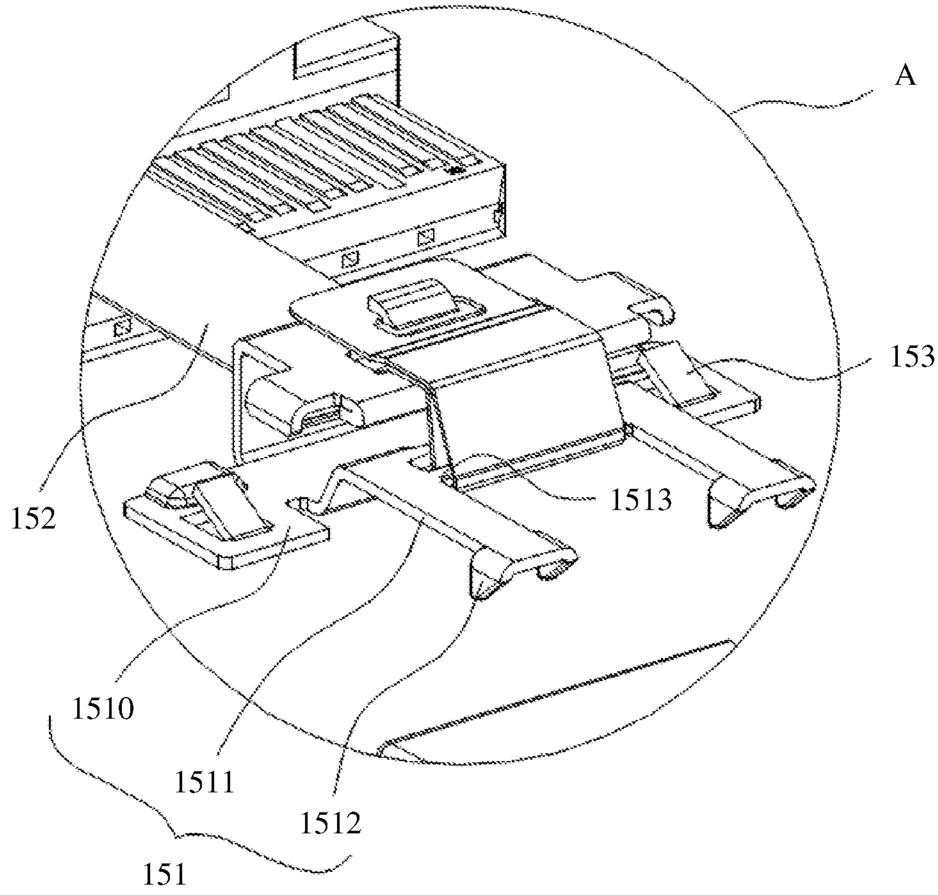
FIG. 8 is an enlarged view of a structure at A in FIG. 6.

Still refer to FIG. 8. FIG. 8 is an enlarged view of a structure at A in FIG. 6. Refer to FIG. 8. The latch body 151 may include a fastening part 1510, force arm parts 1511, and latch parts 1512. One end of the force arm parts 1511 is fastened to the fastening part 1510, the other end of the force arm parts 1511 is fastened to the latch parts 1512. The fastening part 1510, the force arm parts 1511, and the latch parts 1512 may be integrally formed. With reference to FIG. 6 and FIG. 8, the fastening part 1510 may be fastened to the plug housing 110. In an exemplary implementation, the fastening part 1510 may be clamped into positioning grooves 116 on the plug housing 110 by using tilted positioning pieces 153 on the fastening part 1510, so that the fastening part 1510 is fastened to the plug housing 110. The force arm parts 1511 may be of bent strip structures, and may have a specific elasticity, to facilitate locking and unlocking. The pull strap 152 may be fastened to the force arm parts 1511. When the pull strap 152 is pulled, the pull strap 152 may drive the force arm parts 1511 to swing in a direction away from the plug housing 110 relative to the fastening part 1510. After the plug assembly and the socket assembly are plug-connected in position, the latch parts 1512 are fastened to the latch boss 212.

In a possible embodiment, a positioning part 1513 may be disposed on the force arm parts 1511, and the positioning part 1513 may be of a thin sheet-shaped structure having a specific rigidity. The positioning part 1513 and the force arm parts 1511 may be disposed at an included angle. For example, the positioning part 1513 and the force arm parts 1511 may be disposed perpendicularly. The pull strap 152 may be fastened to the positioning part 1513, so that the pull strap 152 is connected to the force arm parts 1511. Specifically, the pull strap 152 may wind around the positioning part 1513 to be connected to the positioning part 1513. More specifically, the positioning part 1513 may be disposed close to one end that is of the force arm parts 1511 and that is connected to the latch parts 1512, so that the force arm parts 1511 can be pulled more effortlessly by using the pull strap 152.

In an exemplary implementation, there may be a plurality of force arm parts 1511. FIG. 8 shows a case in which there are two force arm parts 1511. The two force arm parts 1511 may be disposed in parallel in a second direction. When there are two force arm parts 1511, two ends of the positioning part 1513 may be respectively connected to the two force arm parts 1511.

Figure 9:
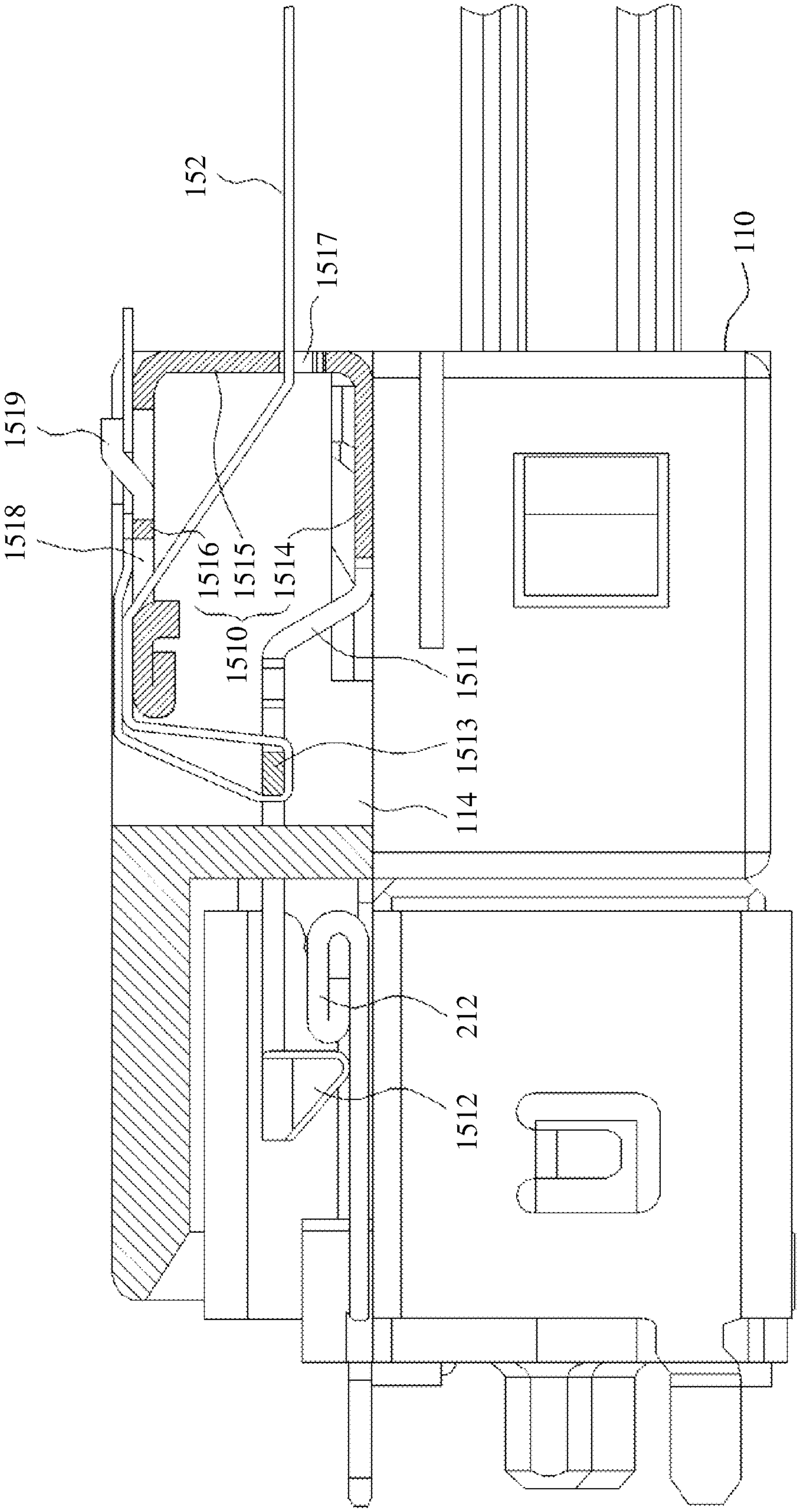
FIG. 9 is a schematic partial section view of a structure of a plug assembly of a connector according to an embodiment of this application.

Still refer to FIG. 9. FIG. 9 is a schematic partial section view of a structure of a plug assembly of a connector according to an embodiment of this application. Refer to FIG. 9. In an exemplary implementation, the fastening part 1510 may include a first side wall 1514, a second side wall 1515, and a third side wall 1516. The first side wall 1514, the second side wall 1515, and the third side wall 1516 are successively connected, and may form a structure approximate to an n shape. In specific disposing, the second side wall 1515 may be perpendicular to the first side wall 1514, and the third side wall 1516 may be perpendicular to the second side wall 1515. For example, the first side wall 1514 may be disposed in parallel with the third side wall 1516, and the second side wall 1515 may be perpendicularly connected between the first side wall 1514 and the third side wall 1516. With reference to FIG. 6 and FIG. 9, the first side wall 1514 may be connected to the plug housing 110. The second side wall 1515 may be provided with a first through hole 1517, and the third side wall 1516 may be provided with a second through hole 1518. When the pull strap 152 and the positioning part 1513 are connected, a first end of the pull strap 152 may successively pass through the first through hole 1517 and the second through hole 1518, for example, pass through the fastening part 1510, wind the positioning part 1513, and then be fastened to the third side wall 1516.

When the plug assembly and the socket assembly need to be unlocked, a second end of the pull strap 152 is pulled, and pulling force is transferred to the positioning part 1513. The first end of the pull strap 152 is fastened to the third side wall 1516, and therefore, under the pulling force, the pull strap 152 may drive the positioning part 1513 to be away from the plug housing 110, so that the force arm parts 1511 are driven to swing in a direction away from the plug housing 110. It may be understood as that a second end of the force arm parts 1511 is lifted relative to the plug housing 110, so that the latch parts 1512 are driven to be away from the latch boss 212, to be unfastened to the latch boss 212.

It can be seen from the above that, the pull strap 152 fits the fastening part 1510, so that unlocking pulling force may be converted into unlocking force perpendicular to a plug-connection direction, to drive the latch parts 1512 to lift for unlocking. Therefore, a limitation on a direction of the unlocking pulling force may be reduced, so that a direction of applying the unlocking pulling force may be more flexible, and an unlocking operation is more convenient.

In an exemplary implementation, a fastening protrusion 1519 may be disposed on the third side wall 1516. More specifically, the fastening protrusion 1519 may be disposed on one side that is of the third side wall 1516 and is away from the first side wall 1514. In addition, compared with the second through hole 1518, the fastening protrusion 1519 may be closer to a joint between the third side wall 1516 and the second side wall 1515. The first end of the pull strap 152 may be provided with a fastening opening, and the first end of the pull strap 152 may be fastened to the fastening protrusion 1519 by using the fastening opening, to be fastened to the third side wall 1516.

In an exemplary implementation, an installation groove 114 may be disposed on the plug housing 110. The latch assembly 150 may be disposed in the installation groove 114. The installation groove 114 may be integrally formed by removing a material from the plug housing 110. The fastening part 1510 is fastened to the installation groove 114. One end that is of the force arm parts 1511 and that is connected to the latch parts 1512 extends out of the installation groove 114, so that when the plug assembly and the socket assembly are plug-connected and fitted, the latch parts 1512 may be fastened to the latch boss 212. The first end of the pull strap 152 extends into the installation groove 114, successively passes through the first through hole 1517 and the second through hole 1518 that are of the fastening part 1510, winds the positioning part 1513, and then is connected to the fastening protrusion 1519 on the third side wall 1516.

Figure 10:
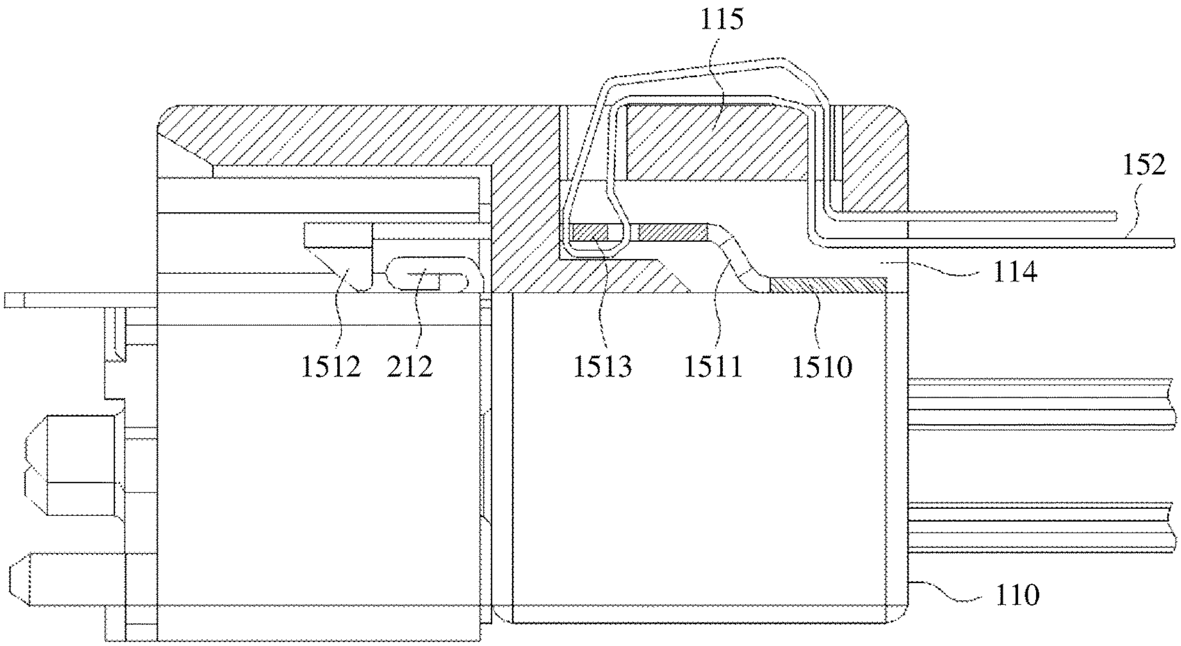
FIG. 10 is a schematic partial section view of another structure of a plug assembly of a connector according to an embodiment of this application.

Still refer to FIG. 10. FIG. 10 is a schematic partial section view of another structure of a plug assembly of a connector according to an embodiment of this application. Refer to FIG. 10. In another exemplary implementation, a cross member 115 may be disposed on a side wall of the installation groove 114. There may be gaps between the cross member 115 and two side walls that are of the installation groove 114 and that are opposite to each other in a first direction. Specifically, the cross member 115 may be fastened to one end that is of the installation groove 114 and that is away from a plug body in a third direction. More specifically, the cross member 115 may be integrally formed when the installation groove 114 is formed by removing a material. A first end of a pull strap 152 may extend into the installation groove 114, and then wind the cross member 115 to be connected to a latch body. Specifically, after extending into the installation groove 114, the first end of the pull strap 152 successively winds the cross member 115 and a positioning part 1513, and then is fastened on the side wall of the installation groove 114, or is fastened at a second end of a plug housing 110 after winding the cross member 115 again, or is fastened at a second end of a plug housing 110 after winding the cross member 115 again and extending out of the installation groove 114. In this exemplary implementation, a fastening part 1510 may be of a plate shape or another shape, which is not limited.

When the plug assembly and the socket assembly need to be unlocked, a second end of the pull strap 152 is pulled, and pulling force is transferred to the positioning part 1513. The first end of the pull strap 152 is fastened to the plug housing 110, and therefore, under the pulling force, the pull strap 152 may drive the positioning part 1513 to be away from the plug housing 110, so that the force arm parts 1511 are driven to swing in a direction away from the plug housing 110. It may be understood as that a second end of the force arm parts 1511 is lifted relative to the plug housing 110, so that the latch parts 1512 are driven to be away from the latch boss 212, to be unfastened to the latch boss 212. The pull strap 152 fits the cross member 115, so that unlocking pulling force may be converted into unlocking force perpendicular to a plug-connection direction, to drive the latch parts 1512 to lift for unlocking.

The foregoing descriptions are merely exemplary implementations of this application, but are not intended to limit the protection scope of this application. Any variation or replacement readily figured out by a person skilled in the art within the technical scope disclosed in this application shall fall within the protection scope of this application.

What is claimed is:

1. A connector, comprising a socket assembly and a plug assembly that are plug-connected and fitted, wherein the socket assembly comprises a socket housing and a socket body, the socket body is disposed in the socket housing, first wiring terminals are disposed on the socket body, and the socket housing is provided with at least one first guide groove extending in a first direction;

wherein the plug assembly comprises a plug housing and a plug body, the plug body is disposed in the plug housing, second wiring terminals are disposed on the plug body, and the second wiring terminals are configured to be electrically connected to the first wiring terminals when the socket assembly and the plug assembly are plug-connected;

wherein one end of the plug housing is provided with at least one guide block extending in the first direction, the respective end of the plug housing faces the socket assembly, and the at least one guide block is configured to be assembled in the at least one first guide groove; and wherein the first direction is a plug-connection direction between the socket assembly and the plug assembly, wherein the at least one first guide groove is formed by protruding the socket housing in a direction away from the socket body, at least one guide boss is disposed on one side of the socket body, and the respective side of the socket body faces the at least one first guide groove, and the at least one guide boss extends in the first direction; and at least one second guide groove is disposed on one side of the at least one guide block, and the respective side of the at least one guide block faces the socket assembly, the at least one second guide groove extends in the first direction, and the at least one second guide groove is configured to be plug-connected to the at least one guide boss.

2. The connector according to claim 1, wherein a latch boss is disposed on the socket housing; and a latch assembly is disposed on the plug housing, the latch assembly comprises a latch body and a pull strap, a first end of the latch body is connected to the plug housing, a second end of the latch body is configured to be fastened to the latch boss, the pull strap is connected to the latch body, and the pull strap is configured to drive the second end of the latch body to move, to separate the latch body from the latch boss.

3. The connector according to claim 2, wherein the latch body comprises a fastening part, force arm parts, and latch parts, the fastening part is connected to the plug housing, one end of the force arm parts is connected to the fastening part, the latch parts are disposed at the other end of the force arm parts, the pull strap is connected to the force arm part, and the latch part is configured to be fastened to the latch boss.

4. The connector according to claim 3, wherein a positioning part is disposed on the force arm parts, the positioning part and the force arm parts are disposed at an included angle, and the pull strap is connected to the positioning part.

5. The connector according to claim 4, wherein the latch body comprises a plurality of force arm parts, the plurality of force arm parts are disposed in parallel in a second direction, and the positioning part is disposed between adjacent force arm parts among the plurality of force arm parts; and the second direction is perpendicular to the first direction.

6. The connector according to claim 4, wherein the fastening part comprises a first side wall, a second side wall, and a third side wall, the first side wall and the third side wall are disposed in parallel, and the second side wall is connected between the first side wall and the third side wall;

the first side wall is connected to the plug housing, the second side wall is provided with a first through hole, and the third side wall is provided with a second through hole; and a first end of the pull strap successively passes through the first through hole and the second through hole, winds the positioning part, and is connected to the third side wall.

7. The connector according to claim 6, wherein the first end of the pull strap is provided with a fastening opening, a fastening protrusion is disposed on the third side wall, and the first end of the pull strap is connected to the fastening protrusion through the fastening opening.

8. The connector according to claim 2, wherein an installation groove is disposed on the plug housing, the latch body is disposed in the installation groove, and the second end of the latch body extends out of the installation groove; and a cross member is disposed on a side wall of the installation groove, and a first end of the pull strap extends into the installation groove, winds the cross member, and is connected to the latch body.

9. The connector according to claim 1, wherein an extension part is disposed at one end of the plug housing and the respective end of the plug housing faces the socket assembly, the extension part comprises a first extension segment, a second extension segment, and a third extension segment, the first extension segment and the third extension segment are respectively located on two sides of the plug housing in the first direction, the second extension segment is connected between the first extension segment and the third extension segment, the first extension segment and the third extension segment are configured to limit the plug housing in the second direction, and the second extension segment is configured to limit the plug housing in a third direction; and the third direction is perpendicular to the first direction and the second direction separately.

10. An electronic device, comprising:

a first circuit board;

a second circuit board;

a cable; and a connector, wherein two ends of the cable are electrically connected to a plug assembly separately, the first circuit board is electrically connected to a socket assembly, the second circuit board is electrically connected to the socket assembly, the plug assembly at one end of the cable is plug-connected to and fits the socket assembly on the first circuit board, and the plug assembly at the other end of the cable is plug-connected to and fits the socket assembly on the second circuit board, wherein the connector comprises a socket assembly and a plug assembly that are plug-connected and fitted, wherein the socket assembly comprises a socket housing and a socket body, the socket body is disposed in the socket housing, first wiring terminals are disposed on the socket body, and the socket housing is provided with at least one first guide groove extending in a first direction, wherein the plug assembly comprises a plug housing and a plug body, the plug body is disposed in the plug housing, second wiring terminals are disposed on the plug body, and the second wiring terminals are configured to be electrically connected to the first wiring terminals when the socket assembly and the plug assembly are plug-connected, wherein one end of the plug housing is provided with at least one guide block extending in the first direction, the respective end of the plug housing faces the socket assembly, and the at least one guide block is configured to be assembled in the at least one first guide groove; and the first direction is a plug-connection direction between the socket assembly and the plug assembly.

11. The electronic device according to claim 10, wherein the at least one first guide groove is formed by protruding the socket housing in a direction away from the socket body, at least one guide boss is disposed on one side of the socket body, and the respective side of the socket body faces the at least one first guide groove, and the at least one guide boss extends in the first direction; and at least one second guide groove is disposed on one side of the at least one guide block, and the respective side of the at least one guide block faces the socket assembly, the at least one second guide groove extends in the first direction, and the at least one second guide groove is configured to be plug-connected to the at least one guide boss.

12. The electronic device according to claim 10, wherein a latch boss is disposed on the socket housing; and a latch assembly is disposed on the plug housing, the latch assembly comprises a latch body and a pull strap, a first end of the latch body is connected to the plug housing, a second end of the latch body is configured to be fastened to the latch boss, the pull strap is connected to the latch body, and the pull strap is configured to drive the second end of the latch body to move, to separate the latch body from the latch boss.

13. The electronic device according to claim 12, wherein the latch body comprises a fastening part, force arm parts, and latch parts, the fastening part is connected to the plug housing, one end of the force arm parts is connected to the fastening part, the latch parts are disposed at the other end of the force arm parts, the pull strap is connected to the force arm part, and the latch part is configured to be fastened to the latch boss.

14. The electronic device according to claim 13, wherein a positioning part is disposed on the force arm parts, the positioning part and the force arm parts are disposed at an included angle, and the pull strap is connected to the positioning part.

15. The electronic device according to claim 14, wherein the latch body comprises a plurality of force arm parts, the plurality of force arm parts are disposed in parallel in a second direction, and the positioning part is disposed between adjacent force arm parts among the plurality of force arm parts; and the second direction is perpendicular to the first direction.

16. The electronic device according to claim 14, wherein the fastening part comprises a first side wall, a second side wall, and a third side wall, the first side wall and the third side wall are disposed in parallel, and the second side wall is connected between the first side wall and the third side wall;

the first side wall is connected to the plug housing, the second side wall is provided with a first through hole, and the third side wall is provided with a second through hole; and a first end of the pull strap successively passes through the first through hole and the second through hole, winds the positioning part, and is connected to the third side wall.

17. The electronic device according to claim 16, wherein the first end of the pull strap is provided with a fastening opening, a fastening protrusion is disposed on the third side wall, and the first end of the pull strap is connected to the fastening protrusion through the fastening opening.

18. The electronic device according to claim 12, wherein an installation groove is disposed on the plug housing, the latch body is disposed in the installation groove, and the second end of the latch body extends out of the installation groove; and a cross member is disposed on a side wall of the installation groove, and a first end of the pull strap extends into the installation groove, winds the cross member, and is connected to the latch body.

19. The electronic device according to claim 10, wherein an extension part is disposed at one end of the plug housing and the respective end of the plug housing faces the socket assembly, the extension part comprises a first extension segment, a second extension segment, and a third extension segment, the first extension segment and the third extension segment are respectively located on two sides of the plug housing in the first direction, the second extension segment is connected between the first extension segment and the third extension segment, the first extension segment and the third extension segment are configured to limit the plug housing in the second direction, and the second extension segment is configured to limit the plug housing in a third direction; and the third direction is perpendicular to the first direction and the second direction separately.

* * * * *